Figure 2:
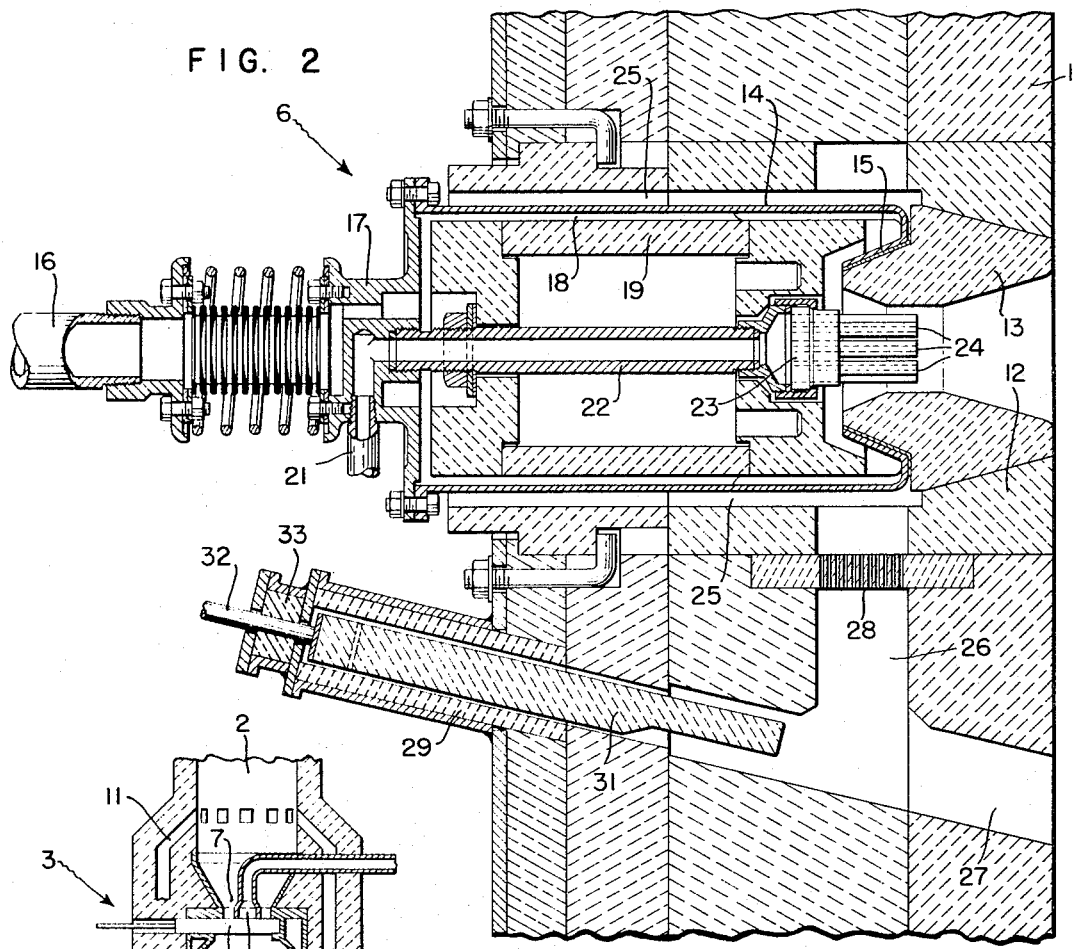

Jan. 2, 1968 E. A. SIEMSSEN 3,361,419
AIR PREHEATING BURNER WITH FURNACE PREHEATING
PASSAGE CLEANER MEANS
Filed May 10, 1966

INVENTOR.
ERNST A. SIEMSSEN
BY
E. W. Mason
ATTORNEY.

United States Patent Office 3,361,419
Patented Jan. 2, 1968

3,361,419
AIR PREHEATING BURNER WITH FURNACE PREHEATING PASSAGE CLEANER MEANS
Ernst A. Siemssen, Norristown, Pa., assignor to Selas Corporation of America, a corporation of Pennsylvania
Filed May 10, 1966, Ser. No. 548,909
3 Claims. (Cl. 263—29)

The present invention relates to tower or shaft furnaces, and more particularly to furnaces that are used for bloating clay and the like in the manufacture of lightweight aggregate.

In furnaces of the type with which the invention is concerned, small particles of clay or a similar material that is capable of being bloated are dropped through a furnace chamber. During their fall they are heated to fusion temperature by flames and hot products of combustion from burners that fire directly into the chamber. The bloated particles fall to the bottom of the chamber and are collected. Combustion air supplied to the burners is preheated, usually by withdrawing furnace gases through heat exchangers built into the burners. The slight currents set up by this withdrawal cause a few hot particles to separate from the falling stream and move toward the exhaust openings. Over a period of time these particles reduce the flow of gases and preheat the combustion air, thereby reducing the capacity of the furnace.

It is an object of the invention to provide, in tower furnaces, means whereby the blocking of exhaust openings in a tower furnace wall can be overcome. It is a further object of the invention to provide means for keeping open a passage in a furnace wall. An additional object of the invention is to provide means through which hot gases can be continuously delivered to heat exchange passages in a burner inserted in a furnace wall.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
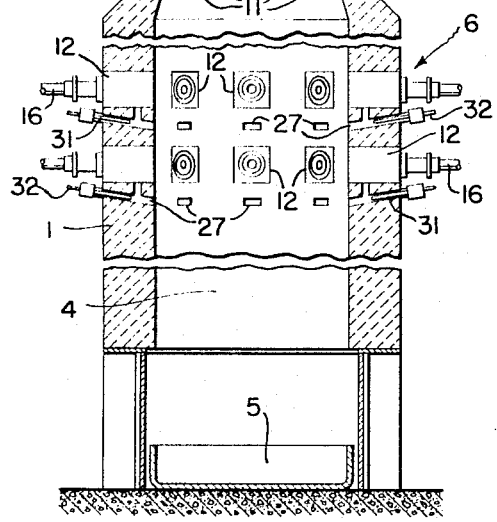

In the drawings:

FIG. 1 is a sectional view through a furnace, and
FIG. 2 is an enlarged section through a burner used in the furnace.

The furnace with which the invention is used is of the type disclosed in Blaha Patent 3,046,607 and includes structure forming a furnace 1 built of suitable refractories in accordance with ordinary furnace practice. The furnace includes a supply and preheat chamber 2 that is separated by a feed mechanism 3 from a bloating chamber 4. Any suitable collecting mechanism, shown diagrammatically herein as a pan 5, is located beneath chamber 4. The furnace chamber is heated by burners 6, which will be described in detail below.

Feed mechanism 3 includes structure forming an annular passage 7 that may be divided into a plurality of small openings arranged in a ring. Flow of particles through the passage is controlled by a slide valve 8 that is guided for horizontal movement in a water cooled fixture. The center of passage 7 is formed by a hollow member 9 that forms a vent to the exterior when valve 8 is opened. In addition passages 11 are formed in the furnace structure between chambers 4 and 2 through which products of combustion can pass to preheat the supply of material in chamber 2.

In the operation of the apparatus thus far described, small particles, substantially uniform in size, of clay, shale or similar fusible material, are placed in chamber 2. When the furnace chamber 4 has been brought up to fusing temperature of the particles and while the burners are being fired, valve 8 is opened. The particles fall in an annular stream through the center of the furnace. As they fall they are individually heated to fusion temperature and, if of suitable material, bloat into small spheres. The fused particles are collected at the bottom of chamber 4. Hot products of combustion from the burners may escape from the bottom of the furnace. Some of them, however, will pass through passages 11 and through the supply of material in chamber 2 to preheat it. Some of the products of combustion will also move through the center vent passage of member 9. These gases sweep across the incoming particles and carry away any dust that may have been created by abrasion of the particles.

The burners 6 are generally similar to those in Blaha Patent 3,101,773 and are located in a plurality of rows around the furnace wall as shown. Each burner assembly includes a burner block 12 that is built into the furnace wall. This block has an opening extending through it from one side of the furnace wall to the other, the end of the opening at the outer side of the wall being larger in diameter than the chamber end which has cemented in it a port block 13. A cylindrical, metal burner body 14 is located in the opening of burner block 12 with a reentrant portion 15 thereof against and centered by the inner end of port block 13.

Combustion air is supplied to the burner through a pipe 16 that is connected with a fitting 17 attached to the back of body 14. The air flows through an annular passage 18 formed between the interior of the body and a ceramic cylinder 19 centered in the body, with the air being discharged into the furnace chamber through port block 13. Fuel gas is supplied from a pipe 21 through a passage in fixture 17, pipe 22 and burner screen 23 to be discharged into the furnace chamber through a plurality of small tubes 24.

It will be noted that there is an annular space 25 formed between the enlarged outer portion of the opening in burner block 12 and the exterior of burner body 14. This space is in communication with furnace chamber 4 by means of a vertical passage 26 that meets a sloping passage 27. Passage 27 may exit into the chamber at any position around the burner block, but preferably below the block as shown. It is noted that, if desired, the burner block can be made large enough to include passages 26 and 27 instead of having them in the refractory of the furnace wall, as shown. A screen 28 can be located in passage 26 to direct a flow of gases through this passage evenly around space 25.

A branch of passage 27 continues through the furnace wall and a sleeve 29 attached thereto. A plunger 31 having an operating rod 32 attached to it, is slidably received in sleeve 29. Rod 32 is long enough so that plunger 31 can be moved through passage 37 until its end projects into chamber 4. Rod 32 is guided in a stuffing box 33.

In the operation of the burner, gas is supplied through pipe 21 while air is supplied through pipe 16 with the desired ratio of gas and air being obtained by a conventional ratio controller. Ordinarily the gas pressure will be in the neighborhood of 2″ W.C. while the air will be in the neighborhood of 1½″ W.C. Under these low pressures the gas and air will flow through their respective passages, and will meet in a substantially non-turbulent condition at the throat of the opening in port block 13. The gas and air will gradually mix so that burning will take place with a relatively lazy flame a short distance in front of the burner block. The length of the flame can be varied by varying the gas and air pressures.

Ordinarily the furnace is operated with the heating chamber at a pressure slightly above atmospheric and it is intended that this should be the case here. Since this is the case, combustion gases will flow back through passages 27 and 26 into space 25 before being discharged. As the hot gases flow through space 25 they will transfer heat to body 14, thus preheating the air flowing to the combustion zone.

The flow of furnace gases into passage 27 will, over a period of time depending upon the size and number of particles being fused, carry some of the particles into passage 27. These particles will chill and stick to the relatively cooler passage walls. After a period of time the passage will become clogged, thus cutting off the flow of gases through the burner. This reduces the preheating of the combustion air and reduces the furnace temperature. When passages 27 begin to clog, handle 32 can be used to move plug 31 into and through passage 27 to dislodge the material sticking to the walls of the passage, thereby opening the passage for the free flow of gases. The handles 32 of the plugs for the individual burners can be moved manually from time to time as necessary, or they can be moved automatically.

The very simple expedient of providing a means for keeping open the passages through which the preheating gases flow provides a means for maintaining the temperature and efficiency of the furnace high without the necessity of shutting down the furnace to clean out the passages. If desired, plug 31 can be used in normal operation of the furnace to block passage 26 partially, and therefore control the flow of gases through that passage and the preheat.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In a furnace structure including a wall forming a furnace chamber, a burner block in said wall, said block being provided with an opening therein extending from said chamber to the outside thereof, a burner including a body received in said opening, said burner being operative to fire into said chamber, the portion of said opening away from said chamber being larger than said body to form a space therebetween, means forming a passage extending through said wall from said chamber at one side of said burner block to said space whereby combustion gases can flow from said chamber through said passage and space to the outside of said furnace, a plunger, means to mount said plunger for movement into and out of a portion of said passage communicating with said chamber and means to move said plunger through said portion of said passage.

2. The combination of claim 1 in which said passage opens in said chamber at a point below said burner block.

3. The combination of claim 1 in which said space surrounds said body and means in said passage to direct the gases traveling therethrough evenly around the body in said space.

References Cited

UNITED STATES PATENTS

| | | | |
|---|---|---|---|
| 2,244,079 | 6/1941 | Phillips | 266—42 |
| 3,002,734 | 10/1961 | Koopal | 263—31 |
| 3,028,907 | 4/1962 | Hensel | 158—113 |
| 3,101,773 | 8/1963 | Blaha | 158—109 |

FREDERICK L. MATTESON, JR., *Primary Examiner.*

A. D. HERRMANN, *Assistant Examiner.*